United States Patent
Kalmbach

(10) Patent No.: US 6,221,424 B1
(45) Date of Patent: *Apr. 24, 2001

(54) GRANULAR FEED NUTRIENT SUPPLEMENTS

(76) Inventor: Paul Kalmbach, 7785 Court Rd. 29, Upper Sandusky, OH (US) 43351

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 07/936,942

(22) Filed: Aug. 28, 1992

(51) Int. Cl.$^7$ ........................................ A23K 1/18
(52) U.S. Cl. .................. 426/807; 424/438; 424/442
(58) Field of Search .................... 424/438, 442; 426/302, 807

(56) References Cited

U.S. PATENT DOCUMENTS

| | | |
|---|---|---|
| 2,295,643 | 9/1942 | Emery et al. .......................... 99/2 |
| 2,512,537 | 6/1950 | Zellers .................................. 99/2 |
| 3,014,800 | 12/1961 | Guidarelli ............................. 99/2 |
| 3,119,738 * | 1/1964 | Nichols ......................... 424/438 X |
| 3,155,521 | 11/1964 | Ward et al. .......................... 99/2 |
| 3,600,189 | 8/1971 | Raynal ................................ 99/6 |
| 3,794,740 * | 2/1974 | Achorn et al. ..................... 426/69 |
| 3,993,796 | 11/1976 | Steinke . |
| 4,000,318 * | 12/1976 | Ferguson et al. .............. 426/807 X |
| 4,310,552 * | 1/1982 | Duchstein ......................... 424/442 |
| 4,338,336 | 7/1982 | Glabe et al. ........................ 426/1 |
| 4,394,377 | 7/1983 | Spires ............................... 424/177 |
| 4,686,105 | 8/1987 | Dahlgren et al. .................. 426/74 |
| 4,713,245 * | 12/1987 | Ando et al. ....................... 424/438 |
| 4,775,539 | 10/1988 | Van de Walle .................... 426/74 |
| 4,804,547 | 2/1989 | Vanderbilt et al. ................ 426/74 |
| 4,876,097 * | 10/1989 | Autant et al. ................ 426/807 X |
| 4,988,520 | 1/1991 | Overton ............................. 426/74 |
| 4,996,067 * | 2/1991 | Kobayashi et al. .......... 426/807 X |
| 4,997,469 * | 3/1991 | Moore ........................ 426/807 X |
| 5,006,341 * | 4/1991 | Davis et al. ...................... 424/442 |
| 5,019,148 | 5/1991 | Moore ................................ 71/11 |
| 5,080,917 * | 1/1992 | Itoh et al. .................... 426/807 X |
| 5,202,136 | 4/1993 | Evans et al. ......................... 426/2 |
| 5,211,980 | 5/1993 | Cox ................................ 426/601 |
| 5,260,089 | 11/1993 | Thornberg ........................ 426/624 |
| 5,629,038 * | 5/1997 | Kalmbach ........................ 424/442 |

FOREIGN PATENT DOCUMENTS

WO 89/03805   5/1989   (WO) .

OTHER PUBLICATIONS

Technical Information on Aureomycin Chlortetracycline Granular Premix, p. 1–8 (1988).
Brochure on Aureomycin Granular (1992).

* cited by examiner

Primary Examiner—Robert H. Harrison
(74) Attorney, Agent, or Firm—Standley & Gilcrest LLP

(57) ABSTRACT

A granular feed nutrient supplement is formed by pelletizing a mixture of minerals, vitamins and other nutrients along with a carrier such as cornmeal or the like and optionally a lubricant such as fat and/or a binder. The pellets are rolled to a desired size and combined with bulk feed. The size of the formed granules are maintained close to the average particle size of the bulk feed thereby ensuring that the granules remain suspended in the feed and do not separate. Preferably the density of the granules is close to (±30%) the density of the feed.

8 Claims, No Drawings

GRANULAR FEED NUTRIENT SUPPLEMENTS

BACKGROUND OF THE INVENTIONS

Properly feeding animals, particularly farm animals, is absolutely critical for maintaining health and maximizing growth and production. In addition to the obvious requirements of protein, starch and fats, animals must receive additional nutrients in substantially lesser amounts. These nutrients such as minerals and vitamins are absolutely critical for the health of the animals. Unfortunately, animals will not feed on a 100% nutrient composition in the correct amounts. Therefore, the nutrients must be provided to the animals in a way so that the correct amounts are consumed.

One way to provide the nutrients to the animal is to mix them with the other feed ingredients that provide protein, starch and fat. Premixes of minerals and vitamins can be obtained and added to the bulk feed of the animal. Generally these are combinations of free flowing meals and powders of different sizes, shapes and densities. These nutrient products do not remain suspended in the bulk feed and tend to separate. Further, it is difficult to keep these mixed adequately to maintain an even concentration of a nutrient throughout the bulk feed. Another disadvantage is that the nutrients separate from each other both in bulk and in the feed because of the different sizes, shapes and densities.

A solution to this is to form processed feed particles which includes nutrients. However, for many farmers to invest in the manufacturing process to produce these products is cost prohibitive.

Bulk feed supplements which are over 26% protein and which farmers can feed to animals with other grain products are also known. But these are used at high concentration and are designed to be an animal's protein source and nutrient source. No care was ever given to maintaining these suspended in bulk feed.

SUMMARY OF THE INVENTION

Accordingly, it is an object of the present invention to provide a method to combine nutrients with bulk feed for farm animals. More particularly, it is an object of the present invention to provide such a mechanism whereby the nutrient supplement remains suspended in the feed to ensure desired concentration levels are maintained.

The objects of the present invention are obtained by forming pellets which have a high concentration of the nutrients in combination with a carrier and, if necessary, a lubricant and/or a binder. The pellets are then rolled to a size which is approximately equal to or greater than the size of the average particle size of the bulk feed. When combined with the feed, these particles, due to their size and approximate density, remain suspended in the feed and do not separate as easily over prolonged periods of time.

This provides an effective, efficient way to supply nutrients to farm animals. Further, due to the convenience, different nutrient pellets can be formulated for a variety of different animal needs such as lactating or nonlactating cows, young animals, older animals, chickens, turkeys, and so on.

The objects and advantages of the present invention will be further appreciated in light of the following detailed description.

DETAILED DESCRIPTION

To supply nutrients to farm animals, high concentration nutrient granules are formed and combined with the bulk feed of the animals. These nutrient granules will generally include a high concentration of nutrients, a carrier and if necessary a lubricant and/or binder. The nutrients can be a variety of different compositions. Generally these will include minerals and vitamins. These nutrients along with the range of concentration that would be incorporated in the pellets of the present invention in order to provide the total nutritional requirements for the animal are listed below according to nutrient concentration (as compared to ingredient or actual mineral concentration).

| Nutrient | Approximate Range |
|---|---|
| Sodium Chloride | 0 to 25% |
| Calcium | .5% up to 20% |
| Phosphorus | .3% up to 11% |
| Zinc | 200 up to 20,000 mg/lb. |
| Iron | 200 up to 20,000 mg/lb. |
| Manganese | 200 up to 20,000 mg/lb. |
| Copper | 30 up to 80,000 mg/lb. |
| Iodine | 5 up to 1,200 mg/lb. |
| Cobalt | 2 up to 200 mg/lb. |
| Selenium | 1 up to 300 ppm |
| Vitamin A | 20 up to 4,800 KIU/lb. |
| Vitamin D-3 | 5 up to 40,000 KIU/lb. |
| Vitamin E | 50 up to 40,000 KIU/lb. |
| Vitamin K | 50 up to 20,000 mg/lb. |
| Niacin | 100 up to 24,000 mg/lb. |
| Vitamin B-12 | 35 up to 8,000 mcg/lb. |
| Riboflavin | 20 up to 4,000 mg/lb. |
| Pantothenic Acid | 30 up to 8,000 mg/lb. |
| Biotin | 25 up to 74,000 mcg/lb. |
| Folic Acid | 1 up to 400 mg/lb. |
| Thiamine | 15 up to 2,400 mg/lb. |
| Pyridoxine | 15 up to 2,400 mg/lb. |
| Choline | 100 up to 200,000 mg/lb. |
| Amino Acids | 0 to 20% |

These ranges are listed by nutrient concentration. The actual ingredient inclusion rate will depend upon the concentration of that nutrient that the ingredient contains.

These will then be combined with a carrier. A carrier can be any of a large number of digestible or nondigestible edible and GRAS (generally recognized as safe) ingredients. These would, for example, include animal protein products, and forage products, grain products, plant protein products, processed grain by-products, roughage products. These are more fully listed below:

| Animal Protein Products | |
|---|---|
| Dried Blood Meal | Hydrolyzed Poultry Feathers |
| Animal By-Product Meal | Meat and Bone Meal |
| Fish By-Product | Meat Meal |
| Fish Meal | Poultry By-Product Meal |
| Dried Fish Solubles | Dried Whey |
| Hydrolyzed Poultry By-Product | |

| Forage Products |
|---|
| Alfalfa Meal |

| Grain Products | | |
|---|---|---|
| Barley | Grain Sorghums | Corn Feed Meal |
| Corn | Oats | Wheat |
| Rye | Triticale | |

-continued

Plant Protein Products

| | |
|---|---|
| Cottonseed Meal | Soy Protein Concentrate |
| Linseed Meal | Soybean Meal |
| Peanut Meal | Soy Flour |
| Rapeseed Meal | Sunflower Meal |
| Canola Meal | Yeast |

Processed Grain By-Products

| | |
|---|---|
| Asperated Grain Fractions | Corn Distillers Dried Grains |
| Brewers Dried Grains | With or Without Solubles |
| Corn Flour | Flour |
| Corn Gluten Feed | Hominy Feed |
| Corn Gluten Meal | Oat Groats |
| Feeding Oat Meal | Rye Middlings |
| Sorghum Grain Flour | Wheat Bran |
| Wheat Middlings | Wheat Flour |
| Wheat Mill Run | Wheat Germ Meal |
| Wheat Red Dog | |

Roughage Products

| | |
|---|---|
| Soybean Hulls | Soybean Mill Feed |
| Corn Cob Fractions | Dried Beat Pulp |

Possible products include dried blood meal, animal by-product meal, fish meal, dried fish solubles, hydrolyzed poultry feathers, hydrolyzed poultry by-products, meat and bone meal, meat meal, poultry by-product meal, dried whey, alfalfa meal, corn, oats, wheat, wheat bran, wheat middlings, soybean hulls, cottonseed meal, linseed meal, soybean meal, sunflower meal, yeast, brewers dried grains, corn flour, corn gluten feed, corn gluten meal, corn distillers dried grains, corn distillers dried grains with solubles, oat groats, feeding oat meal, wheat flour, wheat red dog, soybean mill feed and mixtures. Clay or other fillers could be added if desired, but are not necessary.

A lubricant may also be required. Generally these will be a fat or oil source such as animal fat, vegetable oil or blended animal or vegetable fat, oilseed processing byproducts, soapstock, etc. In certain formulations, a binder may be required. Suitable binders include lignin sulfate, bentonite, and gums as well as others.

These are all combined in desired proportions and pelletized. Generally the nutrient ingredients will form from about 1 to about 70% of the product and more typically 4 to 40%. If the supplement is primarily a vitamin and trace mineral supplement, it would form a relatively minor portion of the product. If macro minerals are added these would form a relatively and substantially greater portion of the product. The upper limit, i.e., about 70%, is due to the inability to effectively bind a high mineral content pellet together. Further, if the mineral content is too high, it may not be palletible or pellitable.

Generally, the product will include from about 0 to about 5% fat or oil as a lubricant. If the supplement does not include a significant amount of minerals, i.e., greater than 20%, the carrier itself will effectively lubricate and bind itself to form the pellet under the influence of steam used in the pelletizer. On the other hand, if the concentration of minerals exceeds 20%, about 0.5–1% fat per 10% mineral above 20% should be added. Accordingly, if the product includes 40% mineral ingredients (as opposed to nutrient), 1 to 2% fat should be included.

In producing the pellets of the present invention, the components are blended in any blending apparatus. The product is pelletized by running it through a pellet mill. Pellet mills are, of course, very well known. Several suitable pellet mills are those made by Sprout-Waldron and California Pellet Mill. The pellets can be formed of a variety of different sizes. Generally, the dye size will be from $6/64$ up to $32/64$ of an inch. Typically they will be from $8/64$ to $12/64$.

The formed pellets are cooled through coolers which are generally used with the pellet mill and manufactured by the same companies and ground with a roller mill or crumbler to form granules. These are all screened and separated for size. The coolers and roller mills and crumblers are likewise well known. Generally the size of granules will depend upon the ultimate use but will generally be in the neighborhood of $1/64$ up to $12/64$ of an inch in diameter. These sizes, of course, are average sizes.

The density of the formed granules should be equal to the density of the bulk feed to which they are expected to be added ±30%. Density can be controlled by increasing the carrier concentration, modification of the carrier concentration as well as adjusting parameters within the pelletizer itself such as pressure, steam and temperature as well as ultimate granule size.

The formulated product will generally have 1–30% crude protein, 1–15% crude fat, and 1–15% crude fiber.

One preferred embodiment of the present invention includes the following components:

| Ingredient | Amount/Lbs. |
|---|---|
| Meat & Bone 50% | 800.000 |
| 18.5% Dical Phos. | 468.000 |
| Limestone | 441.000 |
| Salt | 129.000 |
| Wheat Midds | 30.000 |
| Min PMX | 40.000 |
| Fat | 40.000 |
| Alfalfa DHY 17% | 15.000 |
| Choline Chlor 60 | 10.000 |
| Dynamate | 10.000 |
| Vitamin Premix | 10.000 |
| Selenium .06% | 6.000 |
| Vit A 650,000 | .750 |
| Vit E 50% | .500 |

These can be formulated into pellets using an operating temperature of about 130 to 200, preferably 160 to about 170° F., with a steam pressure of 5 to 100 psi preferably, 30 to 60 psi. When the mineral concentration exceeds 20% of the formulation higher steam pressure is usually used, i.e., 40 to 80 psi. This improves the manufacturing process. Depending on the size of the pellet mill, 1–30 tons can be processed per hour. Of course, these are preferred parameters for this formulation and other formulations would be modified which is well within the skill of the art.

Finally, the end product is combined with the feed mix. Generally, the appropriate nutrient granule may be modified to meet the needs of the particular bulk feed that it is combined with. The granule should have a size which is approximately equal to the average particle size of the bulk feed. Further, it will have a density equal to (±30%) of the density of the bulk feed product (about 30 to 55 pounds per cubic foot).

Preferably, the nutrient composition will be added to the bulk feed composition, i.e., starch source and protein source, at a rate of 0.25 to 7.5% based on the weight of the combined nutrient and bulk feed. Lesser amounts can be employed, again, depending on the nutrients in the nutrient granule as well as the concentration of the nutrient in the granule. Generally the overall amount of nutrient supplement, of course, will be added in an amount designed to meet the dietary needs of the animal consuming the bulk feed.

Thus, by forming the nutrients into a nutrient pellet and preparing these in a size which will remain suspended in feed, one can supply these to an animal in a manner designed to reliably supply the nutrient needs of the animal without either overfeeding the animal or undersupplying the needs of the animal. Further, due to the fact that this is a granular feed nutrient premix, a variety of different formulas can be prepared which are uniquely designed for the needs of particular animals based on both species and characteristics of the species such as lactation, pregnancy, age and size. These can then be added to the bulk feed by the farmer to ensure that all of his animals are properly supplied nutrients.

Further, and equally important, the nutrients themselves do not separate and remain evenly distributed in the granule.

The preceding has been, of course, a description of the present invention along with a preferred embodiment of the present invention.

However, the invention itself should only be defined by the appended claims where we claim:

1. A method of feeding nutrients to animals comprising:
   obtaining a feed composition, said feed composition having an average particle size and an average density;
   combining a carrier and nutrients, said carrier and said nutrients combined by weight so as to approximate within 30% said average density of said feed composition, said nutrients comprising 1 to 70% by weight;
   forming granules from said combined carrier and nutrients, said granules having a size comparable to said average particle size of said feed composition, said size at from 1/64 inch to 32/64 inch; and
   combining and suspending said granules with said feed composition, whereby said granules remain suspended in said feed composition.

2. The method claimed in claim 1 wherein said granules form 0.25–7.5% by weight of said combined feed composition and granules.

3. The method claimed in claim 2 wherein said granules comprise 4–40% nutrient ingredients.

4. The method claimed in claim 3 wherein said nutrients are selected from the group consisting of minerals, amino acids, and vitamins.

5. A method of feeding nutrients to animals comprising:
   obtaining a feed composition, said feed composition having an average particle size and an average density;
   combining a carrier and nutrients, said carrier and said nutrients combined by weight so as to approximate within 30% said average density of said feed composition, said nutrients comprising 1–70% by weight, said combination comprising 1–30% crude protein, 1–15% by weight crude fat, and 1–15% by weight crude fiber;
   forming granules from said combined carrier and nutrients, said granules having a size comparable to said average particle size of said feed composition, said at from 1/64 inch to 32/64 inch; and
   combining and suspending from about .25 to about 7.5% of said granules with said feed composition based on the total weight of said granules and said feed composition, whereby said granules remain suspended in said feed composition.

6. The method claimed in claim 5 wherein said granules are from about 8/64th to about 12/64th inch.

7. The method claimed in claim 6 wherein said nutrients comprise 4–40% of said granules per weight on a per weight basis.

8. The method claimed in claim 7 wherein said granules comprise at least 20% minerals.

* * * * *

UNITED STATES PATENT AND TRADEMARK OFFICE
CERTIFICATE OF CORRECTION

PATENT NO. : 6,221,424 B1
DATED : April 24, 2001
INVENTOR(S) : Paul Kalmbach

It is certified that error appears in the above-identified patent and that said Letters Patent is hereby corrected as shown below:

Column 6,
Line 21, after the word said at the end of that line, please add the word "size".

Signed and Sealed this

Fifth Day of March, 2002

Attest:

JAMES E. ROGAN
Attesting Officer     *Director of the United States Patent and Trademark Office*